Jan. 7, 1969   R. K. DICKEY   3,421,062
ELECTRICAL POLYPHASE MACHINE HAVING STATOR AND ROTOR
WINDINGS CONNECTED IN SERIES TO POLYPHASE SUPPLY
Filed July 28, 1964   Sheet 1 of 2

INVENTOR
RICHARD K. DICKEY

BY A. A. Orlinger

ATTORNEY

United States Patent Office 3,421,062
Patented Jan. 7, 1969

3,421,062
ELECTRICAL POLYPHASE MACHINE HAVING STATOR AND ROTOR WINDINGS CONNECTED IN SERIES TO POLYPHASE SUPPLY
Richard K. Dickey, San Luis Obispo, Calif., assignor to The Technical Material Corporation, Mamaroneck, N.Y., a corporation of New York
Filed July 28, 1964, Ser. No. 385,719
U.S. Cl. 318—187     18 Claims
Int. Cl. H02p 5/28

This invention relates to alternating current synchronous machines and more particularly it relates to such machines of the so-called doubly fed kind.

A principal object of the invention is to provide a novel design and construction of a synchronous machine of the doubly fed kind.

Another principal object is to provide such doubly fed machine which, as a motor, possesses a high degree of rotational speed stability.

A further object is to provide an improved induction generator machine of high frequency stability.

It has been known for some time that wound rotor induction motors can have their rotor and stator windings connected to the same polyphase line, and, when so connected, they can be operated at double the normal synchronous speed as compared with the speed resulting from separate excitation of the stator and rotor. If the stator and rotor are excited by respectively different frequencies, it has been possible to obtain synchronous operation at a rate corresponding to the sum or difference of the two excitation frequencies.

It is also known that such machines, having their rotor windings and stator windings connected in parallel to the same polyphase line can operate or generate at a synchronous speed equal to twice the normal speed, and for certain conditions of electric or mechanical loading will have a shaft output double that obtainable by separate excitation of the rotor and stator. However, when operating at frequencies higher than the supply frequency, such doubly fed induction motors exhibit a large negative damping torque whose negative characteristic tends to increase the deviation from synchronous speed which might arise from any cause. It is this dynamic instability of such doubly fed machines that has seriously limited particular fields of usefulness.

Accordingly it is another principal object of this invention to extend the field of usefulness of such doubly fed machines by increasing their dynamic stability.

A further object is to provide a novel doubly fed synchronous generator which has low negative damping torque and high dynamic frequency stability.

A still further object is to provide a doubly fed synchronous motor or induction generator of the wound rotor type, which will operate at a high power factor, high efficiency and very high pull-out torque.

A feature relates to a doubly fed polyphase induction generator of the wound rotor type which has its rotor windings and stator windings connected effectively in series to the same polyphase line, and wherein the reactance usually connected to the line and windings is such as to enable the machine to be self-excited while it is generating.

Another feature of the invention relates to the novel organization, arrangement, and relative location and interconnection of parts which cooperate to provide an improved doubly fed alternating machine.

Other features and advantages will appear from the ensuing descriptions and the attached drawings, wherein FIG. 1 is a schematic diagram of a three-phase doubly fed machine embodying the invention;

The expression doubly fed machine as used herein refers to an induction-type machine, whether motor or generator, having wound stator and wound rotor and with both the rotor and stator windings connected to the alternating current line but with opposite phase rotations of the stator field and rotor field.

I have found that if the rotor windings and the stator windings are fed or excited in series relation to each other with respect to the same alternating current supply, it is possible to run the machine with a high order of speed stability while achieving optimum operational characteristics such as high power factor, high efficiency and very high pull-out torque.

Likewise, when the machine is used as a generator and the rotor is driven from a suitable mechanically driven source (i.e. prime mover), it produces a high order of electric power output. This arrangement also permits the machine to be used as a generator with high efficiency whether supplying a fixed load, for example, of capacitors or resistors in parallel, or whether it is supplying a load having a variable power factor.

One of the drawbacks to the use of a doubly fed, wound rotor induction machine as a motor is that it will not accelerate above half speed; and even then the speed is unstable. In order to counteract any hunting tendency, some special stabilizing means is required either in the form of a stabilizer device or by using only special kinds of loads. I have found that by connecting the doubly fed rotor and stator in effective series relation it is possible to achieve stable operation while retaining the advantages of high power output and high efficiency.

Figure 1:
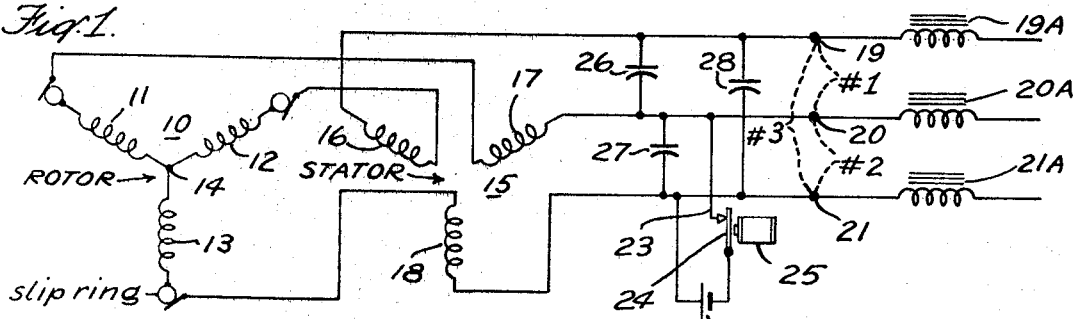

Referring to FIG. 1, there is shown in schematic form a three-phase machine according to the invention comprising a rotor 10 having three balanced Y-connected three-phase windings 11, 12, 13 connected to the common electrical center point 14. Surrounding the rotor is a balanced three-phase wound stator 15 having the three-phases 16, 17, 18 likewise arranged in Y-formation.

The rotor and stator windings are wound on the usual respective laminated iron cores (not shown). These may be of any well known design, the design of the number and arrangement of the windings in the various slots of the rotor and the number and arrangement of the various windings on the stator being well known in the art depending upon the voltage requirements of the system. Preferably the windings on the rotor and stator are such as to produce respective rotating fields of sinusoidal variation, and the windings likewise are such that the rotating field of the stator rotates in the opposite direction to the rotating field of the rotor.

In accordance with the invention, the stator windings are connected in respective series relation with the rotor windings and also with the respective phases #1, #2, and #3 of the three-phase line connected to terminals 19, 20 and 21. If the machine is to operate as a motor, the said terminals are connected for example to a 60 cycle three-phase supply. If the machine is to operate as a generator, the shaft of rotor 10 can be connected to any source of motive power (not shown) for driving the rotor at the speed required to generate the desired frequency and voltage to be applied to the terminals 19, 20 and 21.

The stator windings 16 and 17 are connected across the phase terminals 19, 20 in series with the respective rotor windings 11, 12. Likewise, the stator windings 17, 18 are connected in series with the rotor windings 11, 13 across terminals 20, 21. Similarly the stator windings 16, 18 are connected in series with the rotor windings 12, 13 to terminals 19, 21.

Figure 4:
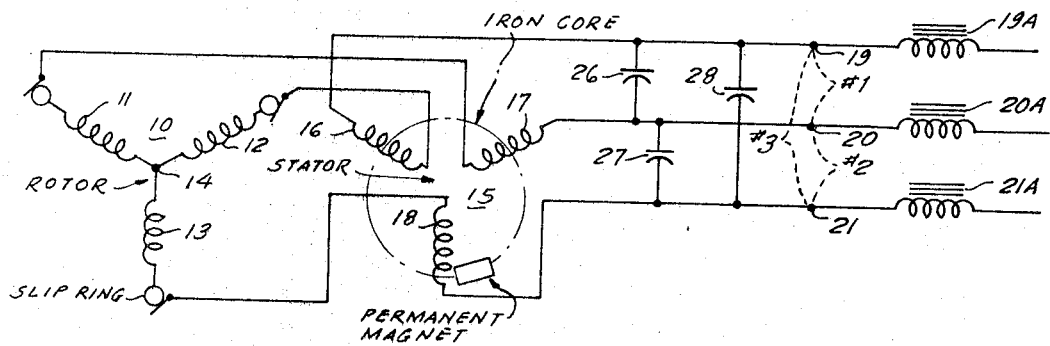
FIG. 4 is a schematic diagram of another modified form of the machine shown in FIG. 1.

When the machine of FIG. 1 is used as a generator, it requires only a small amount of initial core magnetization to enable it to start generating. This initial magnetic flux can be produced by including a small permanent bar magnet at a suitable point in the stator core, as shown in FIG. 4, or in the rotor core. Alternatively, a low voltage direct current source or battery 22 (FIG. 1) can be used to effect the initial magnetic flux. For example, the battery 22 can be connected through the normally closed contacts 23, 24 of a relay switch 25. When the machine starts to generate, a portion of the generated voltage can be applied to the winding of relay 25 to remove the starting battery 22 from the circuit.

I have found that the subsequent excitation of the machine can be maintained by connecting individual capacitors 26, 27, 28 across the respective phase terminals as shown in FIG. 1. While I do not wish to be limited to any theory as to how the excitation is continued after the initial excitation is removed, it is probably along the following lines; and for purposes of simplicity and explanation, reference may be had to one phase of the machine, for example, the phase across terminals 19, 20. The varying inductance of the series connected windings 16, 12, 11 and 17 may be represented by:

$$L = L_1 + L_0 \sin(2\omega t)$$

If the series current forced through the windings is:

$$i = i_0 \sin(\omega t)$$

it can be shown that the voltage E developed across the said windings will be according to the following equation:

$$E = \frac{-\omega L_0 i_0}{2} \sin(\omega t) + \frac{3\omega L_0 i_0}{2} \sin(3\omega t) + \omega L_1 i_0 \cos(\omega t)$$

wherein $L_0$ is twice the maximum value of the mutual inductance between the stator and the rotor; $i_0$ is the maximum value of the current being applied; $L_1$ is the sum of the self inductances of the stator and rotor.

The first term in the above equation is a voltage which is in phase with the original current but of opposite polarity; that is, it adds energy to the circuit so that no external source is needed except that the capacitor 26 assures that the current which flows in response to $\omega L_0 i_0 \sin \omega t$ is in phase with that term. Thus, energy is transferred from the rotor shaft to the capacitor 26 when the inductance changes, and is then returned by the capacitor at the correct instant of time for excitation purposes. The second term of the above equation represents a voltage oscillating at three times the frequency of the current supplied. It can be cancelled by a polyphase connection. The third term of the equation represents a factor which is equal to the leakage reactance of the machine which preferably should be held at a minimum in the design of the machine.

In one generator that was designed according to this invention and produced over 75 kw. output at 60 cycles per second, the rotor had a diameter of 10.5 inches with a length of 6.6 inches. It was wound as a six-pole machine.

In the case of another six-pole machine connected according to this invention, it was found that it was possible to parallel the machine on an infinite 60 cycle bus while running at a measured shaft speed of 2400 r.p.m. An infinite bus is one on which the potential is independent of the current supplied to it or drawn from it. Inherently, an infinite bus is capable of representing a load of leading power factor. Where the machine is connected to such an infinite bus, it may be desirable to connect an inductive reactance 19A, 20A, 21A between each of the terminals 19, 20 and 21 and its respective bus conductor.

When the machine was operating as an alternator, it was possible to parallel it on the bus or main line loaded to 1800 watts; and when the DC driving motor for the alternator was disconnected, it was observed that the alternator would run stably as a synchronous doubly fed series stator-rotor induction motor. The driving direct current motor was then re-connected as a generator and loaded to 1800 watts. A tachometer placed on the shaft of the DC motor showed it to be rotating at a speed of 2400 r.p.m.

When the machine is being used as a motor, it runs synchronously at a rate of 2400 r.p.m. In the machine described, the capacitors 26, 27 and 28 each had a capacity of 50 microfarads. If the number of poles is reduced for example, from six to two, the machine is useful as a high speed two pole motor.

Figure 2:
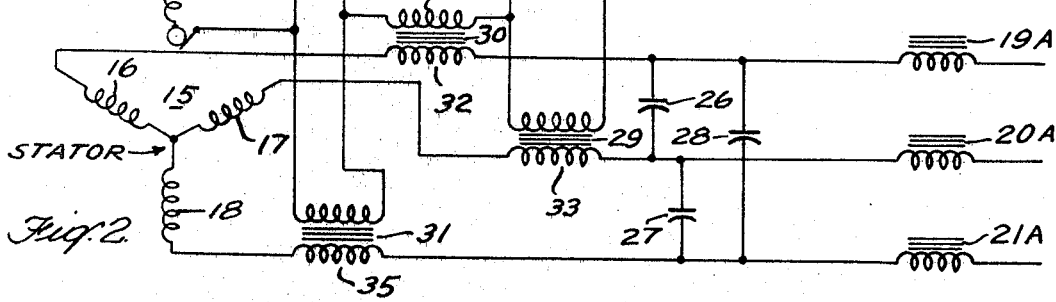
FIG. 2 is a schematic diagram of a modification of FIG. 1.

The circuit of FIG. 1 is predicated upon the electrical center point of the stator windings being accessible. If the electrical point is not accessible, then resort may be had to the transformer interconnections, as shown schematically in FIG. 2. The parts of FIG. 2 which are the same as those of FIG. 1 bear the same designation numerals. In FIG. 2 the three phases at the terminals 19, 20, 21 are effectively connected in series with the stator windings and the rotor windings by means of respective transformers 29, 30, 31.

Thus, the No. 1 phase has terminal 19 connected through the transformer winding 32 and thence through the stator windings 16, 17 and transformer winding 33 to terminal 20. The secondary winding 34 induces a corresponding voltage in the rotor windings 11 and 12. Similarly, for the No. 2 phase, terminal 20 is connected through transformer winding 33 and thence through stator windings 17 and 18 and transformer winding 35 to terminal 21. Transformer 29 in this circuit induces corresponding voltages in the rotor windings 11 and 13. Similarly, for the No. 3 phase, terminal 19 is connected through transformer winding 32 thence through stator windings 16 and 18 and transformer winding 35 to terminal 21. Transformer 31 in this circuit induces corresponding voltages in the rotor windings 12 and 13.

Electrically, therefore, the circuit of FIG. 2 is analogous to the circuit of FIG. 1 in that in effect the various stator windings and rotor windings are energized effectively in series. In this regard, consider that the voltage on the secondary of each transformer is proportionate to that of the primary which is the rotor voltage annd that this voltage is added (by the transformer series connection) to that of the stator; thus, the total voltage is related to the sum of the rotor and stator voltages. Also, the current in the primary of a transformer is constrained by the principle of operation of the transformer to be proportional to that of the secondary; that, in this case, is the stator current. Thus, the equivalence of current and the generation of the sum of the voltages complies with the requirements of the characteristics of the series circuit.

In the foregoing described embodiments of FIG. 1, FIG 2 and FIG. 4, it is to be understood, of course, that the rotor windings are brought out to their respective sliprings and using the necessary brushes, in the conventional manner.

While certain values and parameters have been described herein, it will be understood that the invention is not limited thereto and various changes and modifications may be made therein without departing from the purposes and scope of the invention.

Furthermore, while in FIGS. 1 and 2 the rotor and stator windings are shown in Y-connection, it is to be understood that either or both of them can be connected in delta-connection. Thus, for example, a machine of the invention can be constructed with delta-connected rotor, but with its stator being arranged effectively in Y-connection.

Figure 3:
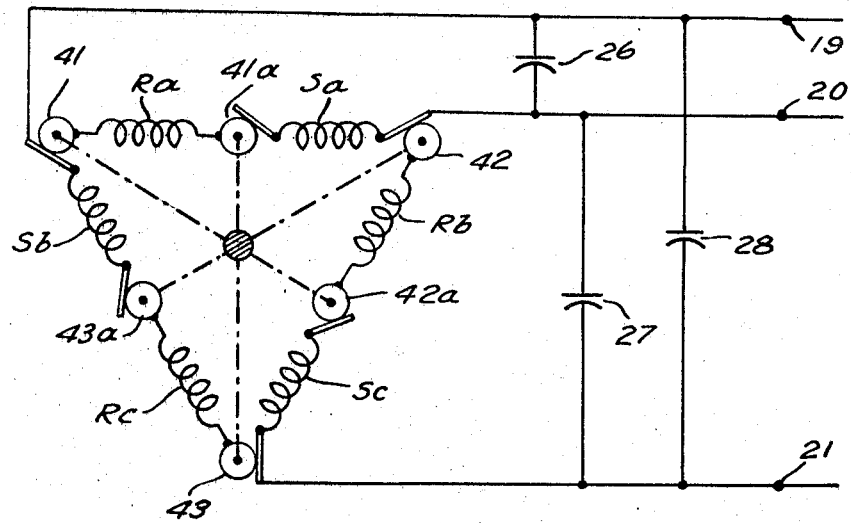
FIG. 3 is a schematic diagram of a delta-connected three-phase doubly fed machine embodying the invention.

Alternatively, as in the embodiment shown in FIG. 3, both the stator windings (Sa, Sb, and Sc) and also the rotor windings (Ra, Rb, and Rc) can be connected in detal-connection. That is done, for example, as shown in FIG. 3, by bringing the rotor windings out to the respectively interposed slip-rings 41, 41a, 42, 42a, and 43, 43a; and terminating the stator windings, as there shown, on the respective brushes which in turn contact the respectively corresponding slip-rings.

Then, as in the other embodiments, the rotor windings are connected in respective series relation with the stator windings and also with the respective phases #1, #2, and #3 of the three-phase line connected to terminals 19, 20 and 21.

Then each of the individual capacitors 26, 27, and 28 is connected across its specific pair of the phase terminals 19–20, 20–21, and 19–21 respectively for maintaining subsequent excitation of the machine, as explained in relation to the other embodiments.

One of the more important advantages of the series connections of the various windings, as hereinabove described, is that it provides an easy means of obtaining larger values of leakage reactance than is normal for conventional induction motors and at no extra cost.

Since the negative damping torque is inversely proportional to the square of the leakage reactance and since a relatively high value of leakage reactance can be achieved, this invention enables designing a doubly fed machine with a sufficiently high leakage reactance so that the negative damping torque can be reduced to the point where its effect would be less than the positive damping effects that are inherent in the nature of the no-load losses, thus rendering the motor highly stable as to speed of operation.

In FIG. 1, FIG. 2 and FIG. 4 the capacitive reactance for cooperation with the leakage reactance in the form of a physical capictor (e.g., a condenser), such as capacitors 26, 27 and 28. However, when the device is set up to be used as an alternator, one or more of these capacitors may be omitted if the line to which the alternator is connected provides the required capacitive reactance which otherwise would be supplied by the individual capacitors as hereinabove illustrated and described.

Furthermore, while the invention has been illustrated by a more detailed description of a three-phase machine, it is to be understood, of course, that it may be embodied equally well in an alternating current machine of the synchronous induction kind having a greater or less number of phases than three. For example, it also can be embodied in such a single-phase machine having its stator and rotor windings in effective series connection in a circuit such as hereinabove described, say, as to FIG. 1, and for the hereinstated purposes of the invention.

What is claimed is:

1. In a doubly fed alternating current machine of the synchronous-induction kind, the combination of a rotor having a single primary inductor winding, a stator having a single secondary inductor winding, means to connect said windings in effective series relation to an alternating current line; and voltage storing means connected to said series connected windings and correlated with the leakage reactance to maintain excitation of the machine after starting thereof.

2. In an alternating current machine of the synchronous-induction kind, polyphase stator windings, polyphase rotor windings, and means connecting each phase of the stator windings respectively in series with only a corresponding phase of the rotor windings effectively in series with an alternating current line whereby both said stator and rotor windings set up respective rotating magnetic fields.

3. In a doubly fed alternating current machine of the synchronous-induction kind, a single primary inductor winding including polyphase stator windings, polyphase rotor windings, a single secondary inductor including and means connecting each respective phase of said stator windings and rotor windings effectively in series to respective phases of polyphase alternating current line provide a leakage reactance is greater than an equivalent machine with the stator and rotor windings connected in parallel.

4. A doubly fed alternating current machine of the synchronous-induction kind, polyphase stator windings, polyphase rotor windings, means connecting each respective phase of said stator windings and rotor windings effectively in series to a respective phase of an alternating current line and thereby to set up respective stator and rotor rotating magnetic fields whereby dynamic hunting is substantially reduced as compared with a similar machine having the stator and rotor windings connected in parallel, and individual voltage storage means connected respectively across each pair of series connected rotor and stator windings and correlated with the leakage reactance of the machine to maintain excitation thereof after initial starting.

5. In a doubly fed machine of the synchronous-induction kind, a polyphase stator, a polyphase rotor, windings for the stator, windings for the rotor, means to connect the stator windings in series with the rotor windings and to a polyphase alternating current line, and reactance means of the voltage storage kind and correlated with the leakage reactance of the machine, and connected to said windings to maintain self-excitation of the machine when running at synchronous speed.

6. A doubly fed alternating current machine according to claim 5, in which said reactance.

7. A doubly-fed alternating current machine according to claim 5, in which said reactance means comprises respective capacitors connected across each respective phase of the machine and correlated with the leakage reactance of the machine.

8. A doubly fed machine according to claim 7, in which said capacitors have a reactance for effectively cancelling the normal inductive reactance of said windings.

9. An alternating current induction motor comprising a single primary inductor in the form of a stator having polyphase windings, a rotor having polyphase windings, and means connecting said stator windings and said rotor windings effectively in series to a polyphase alternating current supply line.

10. An alternating current induction generator comprising a single primary inductor in the form of a stator having polyphase windings, a single secondary inductor in the form of a rotor having polyphase windings, and means connecting each individual phase of said stator windings and each individual phase of said rotor windings effectively in series to a corresponding phase of a polyphase alternating current transmission line.

11. An induction generator according to claim 10, in which said windings produce respective rotor and stator fields rotating in opposite rotational phase, and voltage storing reactance means is connected between the windings and said transmission line and correlated with the leakage reactance of the machine to increase its dynamic stability, and to maintain excitation of the machine after it reaches synchronous speed.

12. A synchronous-induction generator comprising a stator having polyphase windings, a rotor having polyphase windings, means connecting said stator windings and said rotor windings effectively in series across an alternating current transmission line, means to provide the machine with initial magnetic field excitation, and means effective when the machine is reaching normal output voltage to render said initial excitation means ineffective and to render the machine self-exciting under control of its own leakage reactance and the reactance between the machine and said line.

13. A synchronous-induction generator according to claim 12, in which a capacitor is connected across the serially connected windings and the respective phases of said line to effect said self-excitation.

14. A generator according to claim 12, in which the respective rotor and stator windings are connected in effective series relation by means of respective transformers, each transformer having (a) a primary winding connected in series with at least one phase of the stator winding and (b) a secondary winding thereof in series with at least one corresponding phase of the rotor winding.

15. An induction generator according to claim 12, in which the means for effecting said initial excitation includes a permanent magnet connected in the magnetic core on which certain of said windings are arranged.

16. An induction generator according to claim 12, in which the means for effecting said initial excitation includes a source of direct voltage which is temporarily connected in circuit with some of said windings, and switch means are provided for rendering said source ineffective when self-excitation has been established.

17. A doubly fed alternating current machine as claimed in claim 4, wherein said polyphase stator windings are three-phase and connected in Y-connection form, and said polyphase rotor windings are three-phase and connected in Y-connection form.

18. A doubly fed alternating current machine as claimed in claim 4, wherein both the polyphase stator windings and polyphase rotor windings respectively are three-phase and connected in delta-connection form.

References Cited

UNITED STATES PATENTS

| | | | |
|---|---|---|---|
| 2,084,178 | 6/1937 | Angst | 318—197 |
| 3,014,142 | 12/1961 | Lee | 310—162 |

ORIS L. RADER, *Primary Examiner.*

G. Z. RUBINSON, *Assistant Examiner.*

U.S. Cl. X.R.

318—197; 322—47